Feb. 14, 1961  J. L. GRUNDON  2,971,801
TURNTABLE STRUCTURE
Filed Dec. 4, 1957
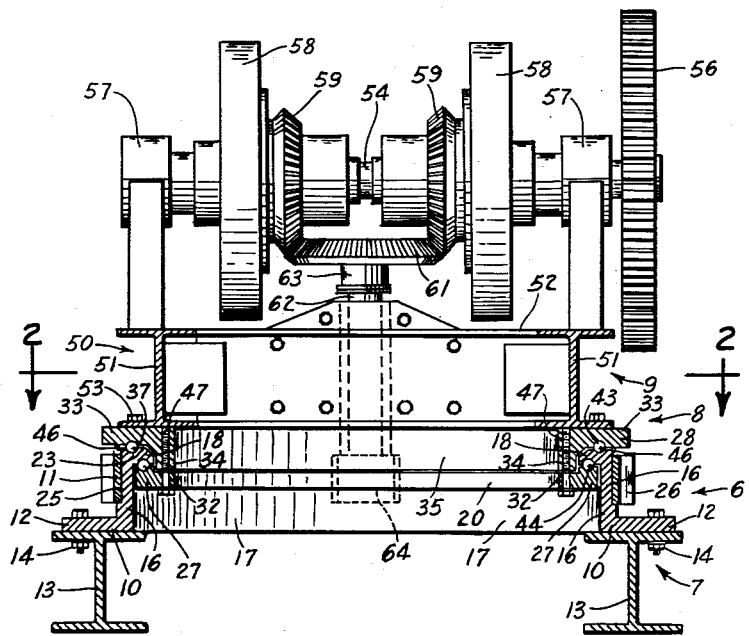
Fig. 1
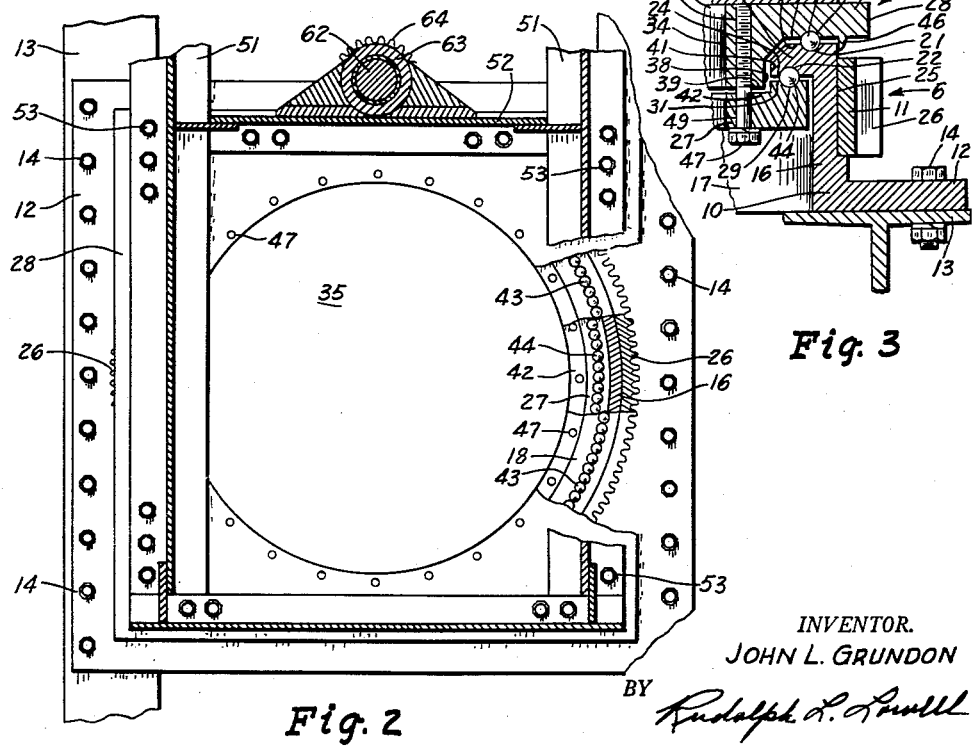
Fig. 2
Fig. 3
INVENTOR.
JOHN L. GRUNDON
BY
ATTORNEY United States Patent Office 2,971,801
Patented Feb. 14, 1961

2,971,801
TURNTABLE STRUCTURE

John L. Grundon, E. 16th and Howard Drive, Des Moines, Iowa

Filed Dec. 4, 1957, Ser. No. 700,617

1 Claim. (Cl. 308—227)

This invention relates generally to turntable units and in particular to a turntable unit for a portable mechanical crane.

An object of this invention is to provide an improved turntable unit for supporting the rotatable frame of a mechanical crane or shovel.

Another object of this invention is to provide a turntable unit for supporting the rotatable frame of a mechanical crane or shovel which is of an improved structural strength, and wherein frictional forces relative to the turntable unit are reduced to a minimum.

A further object of this invention is to provide a turntable unit for supporting a rotatable frame on the main frame of a portable crane, such that the rotatable frame is easily and quickly manipulated and maintained at all times against lateral tipping movement relative to the main frame.

Another object of this invention is to provide a turntable unit which is of a preassembled construction, adapted for heavy duty use, and capable of being operated efficiently over prolonged periods of use with a minimum of servicing and maintenance attention.

Further objects, features, and advantages of this invention will appear from the following description when taken in connection with the accompanying drawings, in which:

Fig. 1 is a vertical transverse sectional view of the turntable unit of this invention shown in assembly relation with a main frame and rotatable frame and a portable mechanical crane;

Fig. 2 is a sectional view taken along the line 2—2 in Fig. 1, with certain parts being broken away to more clearly show the construction of the turntable unit; and Fig. 3 is an enlargement of an area of Fig. 1.

Referring now to the drawings, the turntable unit of this invention is shown as including a stationary ring gear structure 6 (Fig. 1), adapted to be mounted upon a main frame 7, and a ring structure 8, rotatably mounted upon the stationary ring gear structure 6, for supporting a rotatable frame 9 upon which elements of a portable mechanical crane are mounted.

The stationary ring gear structure comprises a base element 10 and a ring gear 11. The base element 10 includes a horizontally disposed, outwardly extended projection 12 which is mounted upon a pair of longitudinally extending main frame members 13, as by nut and bolt assemblies 14. An annular element 16 extends upwardly from the inner end of the projection 12 to form thereby an annular opening 17 (Fig. 1). Another horizontally disposed projection 18 extends inwardly from the upper end of the annular element whereby to form a second annular opening having a diameter less than that of the opening 17. Raceways 21 and 22 (Fig. 3) are formed in the upper and lower surfaces 23 and 24 respectively, of the inwardly extended projection 18. The ring gear 11 is secured about the outer peripheral surface 25 of the annular element 16 and has gear teeth 26 formed thereon.

The rotatable ring structure 8 includes an annular flat rotatable member 27 and another annular rotatable member 28 having an L-shape in transverse cross section. The member 27 is disposed immediately below the projection 18 and the member 28 is disposed above and on the inner side of the projection 18, the arrangement being that the members 27 and 28 enclose all three sides of the inwardly extended projection 18 of the stationary structure 6. The flat rotatable member 27 forms a central opening 20 and has a raceway 29 (Fig. 3) formed in the upper surface 31 thereof. The inner end 32 of the member 27 extends inwardly of the innermost surface of the inwardly extended projection 18.

The L-shaped rotatable member 28, of a substantially square shape, includes a pair of legs 33 and 34 forming a central opening 35 (Fig. 1). The upper leg 33 is horizontally disposed above the inwardly extended projection 18 and extends inwardly and outwardly beyond the inner and outer surfaces respectively of the projection 18. A raceway 36 is formed on the lower surface 37 of the upper leg 33. The other leg 34 depends vertically from the inner end of the upper leg 33 whereby the inner and lower surfaces 38 and 39, respectively, of the leg 34 are contiguous with the respective complementary surfaces 41 and 42 (Fig. 3) of the projection 18 and the member 27. The leg 34, in effect, acts as a spacing means for properly positioning the upper leg 33 and the flat rotatable member 27 as a bearing unit about the inwardly extended projection 18.

Ball bearings 43 are positioned within the complementary raceways 36 and 21 of the upper leg 33 and the upper surface 23 of the projection 18; and ball bearings 44 are positioned within the complementary raceways 22 and 29 of the lower surface 24 of the projection 18 and the upper surface 31 of the flat rotatable member 27. An annular lip element 46 depends from the surface 37 closely adjacent the outer surface 25 of the element 16, whereby to laterally cover the space between the mating surfaces 37 and 23 (Fig. 3), respectively, of the leg 33 and the projection 18.

Clamping means, such as a plurality of bolts 47 are inserted through vertically aligned openings 49 and 48 (Fig. 3) of the flat rotatable member 27 and the depending leg 34, respectively, whereby to secure these elements for rotation about the stationary ring gear structure 10. If necessary, shims or the like may be positioned between the adjacent surfaces 42 and 39 of the flat rotatable member 27 and the depending leg 34 of the rotatable member 28, in order to obtain a desired ball bearing tolerance.

In the assembly of the turntable unit, the ring gear 11 is secured about the peripheral surface 25 of the base element 10. The L-shaped rotatable member 28 is then placed over the inwardly extended projection 18 of the base element 10, the ball bearings 43 having been disposed in the complementary raceways 21 and 36. Ball bearings 44 having been disposed in the raceway 29, the flat rotatable member 27 is then positioned immediately below the inwardly extended projection 18, and secured to the depending leg 34 of the rotatable member 28, as by the bolts 47. The turntable unit, as a complete package, is then mounted on the frame members 13 and secured thereto by the clamping devices 14.

A rotatable frame, indicated generally as 50, has a pair of longitudinal frame members 51 and a pair of transverse frame members 52 arranged in a substantially square shape corresponding in size to the rotatable member 28. The frame members 51 and 52 are mounted on the rotatable member 28 and are secured by bolts 53 to the corner portions thereof. The rotatable ring structure 8, and in turn the rotatable frame 50, are rotatable in reverse directions about the ring gear 26 by the provision of means including a horizontal power shaft 54 having a drive gear 56 at one of its ends adapted to be driven from a suitable power unit (not shown) carried on the frame 50. The shaft 54 is supported in bearings 57 which are mounted on the longitudinal frame members 51. Arranged in a spaced relation on the power shaft 54, and between the bearings 57, are a pair of clutch units, shown generally at 58.

Between the clutch units 58, and in a spaced relation on the shaft 54, are a pair of bevel gears 59 which are in continuous meshed engagement with a common bevel gear 61 carried at the upper end of an upright shaft 62 supported in a bearing 63 mounted on the rear one of the transverse frame members 52. A pinion gear 64 at the lower end of the upright shaft 62 is in continuous meshed engagement with the teeth 25 on the ring gear 26.

The clutch units 58 are operatively associated with an adjacent bevel gear 59 with a power shaft 54. Actuation of the clutch units 58 is accomplished manually by any suitable means (not shown). Thus by driving one or the other of the bevel gears 59, the bevel gear 61 is driven in reverse directions to in turn provide for a reverse travel of the pinion gear 64 about the ring gear 26.

The nested arrangement of the L-shaped rotatable member 28 about the inwardly extended projection 18 of the stationary base element 10 provides for a stable support of the rotatable frame 50 on the stationary ring gear structure 6 at all rotated positions of the frame 50. Additionally, this nested arrangement, when the member 28 is combined with the flat rotatable member 27, retains the member 28 against lateral tipping movement relative to the stationary ring gear structure 6.

The opposed arrangement of the ball bearings 43 and 44 provide for easy rotation of the rotatable ring structure 8, and the provision of the lip element 46 prevents the entry of foreign matter between the open end of the laterally adjacent mating surfaces 23 and 37 and into the ball bearing raceways 21 and 36. From a structural standpoint, the turntable unit is comprised of relatively few parts, the one piece stationary base element 10 being particularly adapted to withstand the lateral stresses and strains resulting from a tendency of the rotatable ring structure and the rotatable frame 9 and associated parts, to tip.

From a consideration of the above description, it is seen that the invention provides a turntable unit for a mechanical crane which is of a rugged construction, adapted for heavy duty work, and comprised of relatively few parts which are easily accessible for maintenance and servicing purposes. Further, the turntable unit is of a preassembled construction so that it can be handled as a single package in its assembly with and removal from the crane.

Although the invention has been described and illustrated with respect to a preferred embodiment thereof, it is to be understood that it is not to be so limited since alterations can be made therein which are within the full scope of the invention as defined by the appended claim.

I claim:

In a portable turntable unit, a main frame and a rotatable frame mounted thereon, said main frame comprising a stationary base element substantially Z-shaped in vertical section and including a horizontally disposed outwardly extending projection for mounting purposes, said outwardly extending projection having a rectangular outline in plan, an annular element extending upwardly from the inner end of said projection, and a projection extending inwardly from the upper end of said annular element, a ring gear extending about the peripheral outer surface of said annular element and secured thereto, an annular rotatable ring positioned below said inwardly extending projection and extending inwardly thereof, the bottom face of said ring being spaced above said outwardly extending projection, an annular rotatable member of L-shape in transverse cross section including a horizontal leg disposed above and extending inwardly of said inwardly extending projection, and another leg depending from the inner end of said horizontally disposed leg to an adjustably spaced position above said annular rotatable ring, the outer peripheral edge of said L-shaped member being located inwardly of the outer peripheral edge of said ring gear, complementary raceways formed in the surfaces between said horizontally disposed leg and said inwardly extending projection, and between said annular rotatable ring and said inwardly extending projection, ball bearings disposed within each pair of complementary raceways, clamping means for adjustably clamping said depending leg to said annular rotatable ring, the open center portions of said annular rotatable member and said annular rotatable ring providing access to said clamping means and the internal wall of said annular element, and said rotatable frame being fixed to the horizontal leg of said L-shaped member and including means to engage said ring gear to turn said rotatable frame.

References Cited in the file of this patent

UNITED STATES PATENTS

| 2,016,292 | Rarey | Oct. 8, 1935 |
| 2,545,122 | Thompson | Mar. 13, 1951 |
| 2,687,334 | Weiss et al. | Aug. 24, 1954 |

FOREIGN PATENTS

| 579,667 | Great Britain | Aug. 12, 1946 |